(12) United States Patent
Bakker et al.

(10) Patent No.: US 12,355,287 B2
(45) Date of Patent: Jul. 8, 2025

(54) DEVICES, SYSTEMS, AND METHODS FOR A DIRECT-CURRENT ENERGY STORAGE TO POWER AN ALTERNATING CURRENT LOAD

(71) Applicant: Yellow Power Systems, LLC, Newberg, OR (US)

(72) Inventors: Anthonius Bakker, Newberg, OR (US); Judith Deborah Homann, Vallejo, CA (US)

(73) Assignee: Yellow Power Systems, LLC, Newberg, OR (US)

( * ) Notice: Subject to any disclaimer, the term of this patent is extended or adjusted under 35 U.S.C. 154(b) by 0 days.

(21) Appl. No.: 18/657,221

(22) Filed: May 7, 2024

(65) Prior Publication Data

US 2024/0297519 A1    Sep. 5, 2024

Related U.S. Application Data

(63) Continuation of application No. 18/656,876, filed on May 7, 2024, which is a continuation of application
(Continued)

(51) Int. Cl.
*H02J 7/00* (2006.01)
*H01M 10/0525* (2010.01)
(Continued)

(52) U.S. Cl.
CPC ....... *H02J 7/0063* (2013.01); *H01M 10/0525* (2013.01); *H01M 10/425* (2013.01);
(Continued)

(58) Field of Classification Search
CPC ..................................................... H02J 7/0063
(Continued)

(56) References Cited

U.S. PATENT DOCUMENTS

| 9,047,075 B1 | 6/2015 | Lee |
| 2014/0103726 A1* | 4/2014 | Martin ............ H02M 1/36 307/64 |

(Continued)

FOREIGN PATENT DOCUMENTS

| EP | 3188349 | 7/2017 |
| JP | 2013201816 | 10/2013 |

OTHER PUBLICATIONS https://en.wikipedia.org/wiki/Mains_electricity#/media/File:World_Map_of_Mains_Voltages_and_Frequencies,_Detailed.svg (accessed May 2, 2024).

(Continued)

*Primary Examiner* — Yalkew Fantu
(74) *Attorney, Agent, or Firm* — Snell & Wilmer L.L.P.

(57) ABSTRACT

A method to connect a direct current power (DC) source to a universal alternating current (AC) load can include an energy storage device configured to output a fixed voltage in a range of 84-135 volts (for 120 volt based systems) or 180-264 volts (for a 230 volt based systems). The universal AC load has input comprising a diode bridge followed by a storage capacitor. The unregulated DC source can be connected to the universal AC load by a switch that is turned on (closed) and off (open) with a low-frequency signal (e.g., 90 and 135 Hz) and a duty cycle between 80% and 98%. A sensor and inductor can be added to protect from excessive currents.

18 Claims, 6 Drawing Sheets

Related U.S. Application Data

No. 18/656,693, filed on May 7, 2024, which is a continuation of application No. PCT/US2024/018141, filed on Mar. 1, 2024.

(60) Provisional application No. 63/449,902, filed on Mar. 3, 2023.

(51) Int. Cl.
  *H01M 10/42* (2006.01)
  *H01M 10/46* (2006.01)

(52) U.S. Cl.
  CPC ......... *H01M 10/46* (2013.01); *H02J 7/00032* (2020.01); *H02J 7/0047* (2013.01); *H02J 7/00712* (2020.01)

(58) Field of Classification Search
  USPC .......................................................... 320/135
  See application file for complete search history.

(56) References Cited

U.S. PATENT DOCUMENTS

| | | | | |
|---|---|---|---|---|
| 2015/0171632 | A1* | 6/2015 | Fry | H02J 7/0042 307/22 |
| 2015/0326044 | A1* | 11/2015 | Ashley | H02J 7/342 320/103 |
| 2020/0195008 | A1 | 6/2020 | Cheng et al. | |
| 2020/0412140 | A1 | 12/2020 | Yamada et al. | |
| 2021/0359350 | A1* | 11/2021 | Chao | H01M 50/204 |
| 2022/0186648 | A1 | 6/2022 | Schoettle et al. | |

OTHER PUBLICATIONS

Sunpower Electronics, https://www.sunpower-uk.com/glossary/what-is-universal-input (accessed May 2, 2024).

Hahn, J. et al. "Modified Sine-Wave Inverter". EnhancedElectronicDesign, https://www.electronicdesign.com/technologies/discrete-power-semis/article/21189030/modified-sinewave-inverter-enhanced?gclid=Cj0KCQiA_P6dBhD1ARIsAAGI7HAXGDfQG_FFudwA5mRQR9BeprWxcL9dVhe2XEUJgJU7SUG0bn9DKH4aAvKcEALw_wcB_August 2006( accessed May 2, 2024).

International Searching Authority, International Search Report and Written Opinion dated Jul. 9, 2024 in International Application PCT/US2024/018141.

International Preliminary Examining Authority, Written Opinion of the International Preliminary Examining Authority dated Feb. 24, 2024 in PCT/US2025/018141.

* cited by examiner

DEVICES, SYSTEMS, AND METHODS FOR A DIRECT-CURRENT ENERGY STORAGE TO POWER AN ALTERNATING CURRENT LOAD

CROSS-REFERENCE TO RELATED APPLICATIONS

This application is a continuation of, claims priority to U.S. Non-Provisional application Ser. No. 18/656,876 filed on May 7, 2024 and titled "DEVICES, SYSTEMS, AND METHODS FOR CONNECTING A DIRECT-CURRENT ENERGY STORAGE TO AN ALTERNATING CURRENT LOAD" (hereinafter the '876 application). The '876 application is a continuation of, claims priority to U.S. Non-Provisional application Ser. No. 18/656,693 filed on May 7, 2024 and titled "DEVICES, SYSTEMS, AND METHODS FOR CONNECTING A DIRECT-CURRENT ENERGY STORAGE TO AN ALTERNATING CURRENT LOAD" (hereinafter the '693 application). The '693 application claims priority to PCT Application No. PCT/US2024/018141, filed Mar. 1, 2024 and titled "DEVICES, SYSTEMS, AND METHODS FOR CONNECTING A DIRECT-CURRENT ENERGY STORAGE TO AN ALTERNATING CURRENT LOAD" (hereinafter the '141 application). The '141 application claims priority to, and benefit of, U.S. Provisional Application No. 63/449,902, filed Mar. 3, 2023, and titled "DEVICE, SYSTEMS, AND METHODS FOR CONNECTING A DIRECT-CURRENT POWER SOURCE TO A UNIVERSAL VOLTAGE AC LOAD," (hereinafter the '902 application). The '876 application, the '693 application, the '141 application and the '902 application are hereby incorporated by reference in their entirety for all purposes.

FIELD

The present disclosure generally relates to devices, systems and methods related to direct-current power sources, and more particularly to direct current power sources configured to power alternating current loads.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

The worldwide electricity grid is a vital and complex system that provides electrical energy to virtually every household, business, and industry. With very few exceptions, this grid is based on alternating current ("AC") with average frequencies of either 50 or 60 Hz. The choice in favor of AC versus direct current ("DC") was made over a hundred years ago and was based on the economics of generation and distribution. These economics have significantly changed over the last few decades with the rise of inexpensive electronics and alternative forms of energy generation, namely wind turbines and solar panels, as well as the increased cost of copper used for transmission lines. Recently, storage in the form of batteries have added additional weight on the DC side of the trade-off. Nowadays, most people skilled in the art have the opinion that a DC grid is favorable over an AC grid. However, the existing infrastructure for the AC grid is so overwhelming that it is expected to take many decades if it is decided to move from an AC electricity grid to DC electricity grid.

To connect a DC source like a battery or a solar panel to an AC load, a so-called DC-to-AC converter (i.e., an "inverter") is utilized. This converter uses a high-frequency (20-200 kHz) pulse-width modulated ("PWM") signal connected to high-voltage (e.g., ≈400V) power transistors and a large inductor or transformer to smooth out the high frequency signal to only provide a low-frequency (50-60 Hz) pure sine wave. This inverter adds significant cost to the system. Moreover, the efficiency of this inverter is typically between 85-90%, which increases the cost of the battery/solar panel, and requires significant heat sinks and cooling fans.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
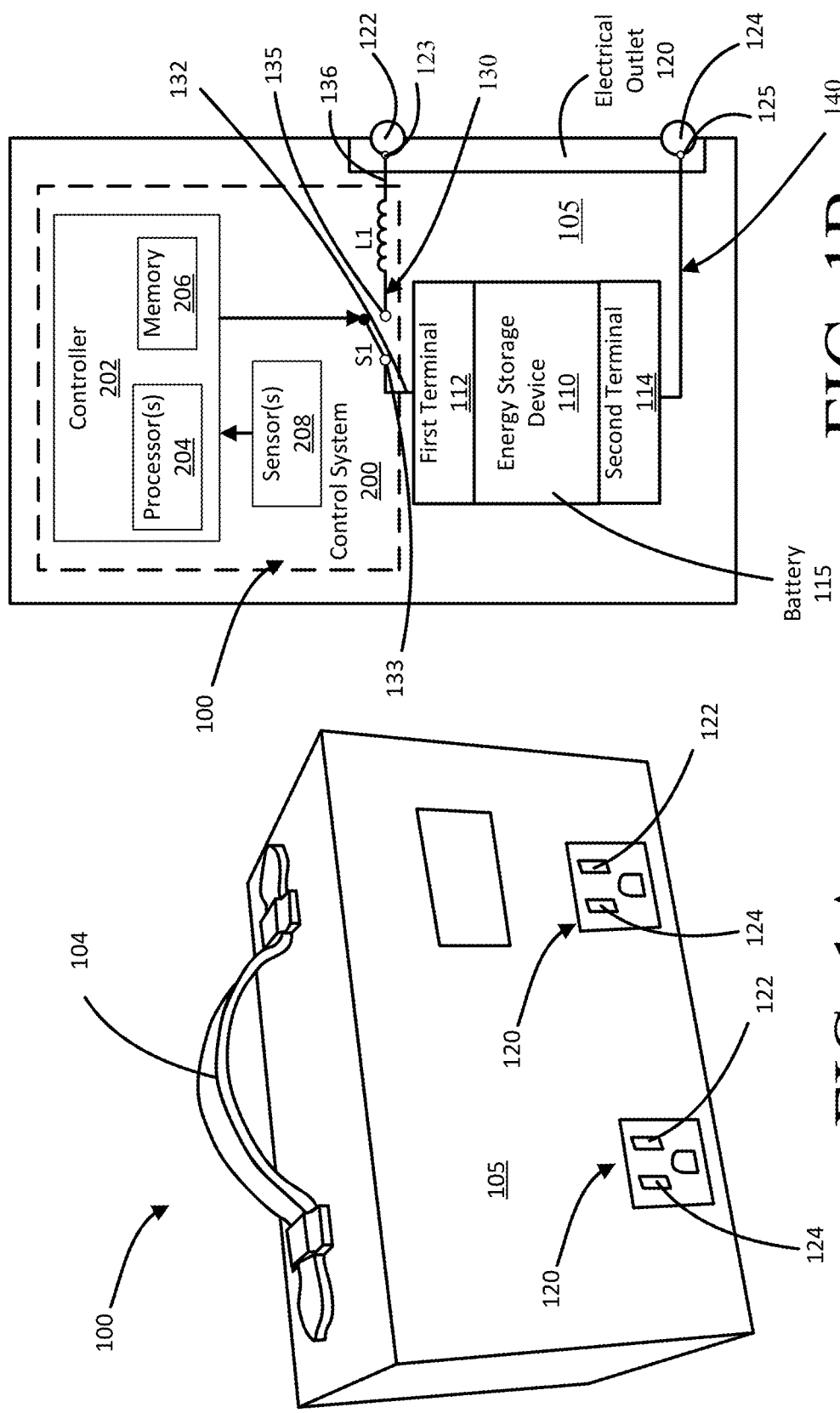
FIG. 1A illustrates a perspective view of a power source, in accordance with various embodiments.
FIG. 1B illustrates a schematic view of a power source, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a highly efficient (i.e., >99% efficiency) and inexpensive method to connect a power source (e.g., an electrical storage, such as a battery, a fuel cell, a supercapacitor, etc. that supplies a direct, or fixed, current) to a universal AC load. The cost of the power source and system disclosed herein is greatly reduced compared to existing solutions (i.e., energy storage devices with inverters or other types of DC/AC converters). For example, the volume of the power source disclosed herein can be reduced by 5 times and the weight by 3 times relative to existing solutions, in accordance with various embodiments.

Disclosed herein is a power source with an energy storage that supplies direct current (DC) and is configured to power a universal alternating current (AC) load. A "direct current" as referred to herein is a current that is supplied at a constant amperage plus or minus 10%, or plus or minus 5%, or plus or minus any other typical fluctuations of direct current supplied by energy storage devices. A "universal AC load" as described herein refers to an AC load that is an electrical load configured to be powered by any AC input voltage that is offered anywhere in the world. Stated another way, a "universal AC load" includes an input voltage range between 85 Volts and 264 Volts and capable of operating at a frequency between 47 Hz and 63 Hz. For example, the following input voltage and frequency combinations are considered to be encompassed within the definition of a "universal AC load": 220 V, 50 Hz; 230 V, 50 Hz; 100 V, 60 Hz; 110 V, 60 Hz; 115 V, 60 Hz; 120 V, 60 Hz, 127 V, 60 Hz; 220 V, 60 Hz; 230 V, 60 Hz; 240 V, 60 Hz; 100 V, 50 Hz; 110 V, 50 Hz; 115 V, 50 Hz, and 127 V, 50 Hz. The present disclosure is not limited in this regard. The universal AC load as described herein is broadly established and well defined within the art. As described further herein, the input of a universal AC load may include a diode bridge followed by a storage capacitor.

As referred to herein, any range provided herein includes rounding up from at least two significant digits after the decimal and rounding down from at least two significant digits after the decimal. For example, the input voltage range between 85 Volts and 264 Volts includes 84.5 Volts on the lower end and 264.49 Volts at the upper limit.

Although described herein as being capable of powering a universal AC load, the present disclosure is not limited in this regard. For example, the power source disclosed herein can be configured to power an AC load that is specific to operational parameters in an area of the world. For example, a power source with an electrical storage that has a voltage output in the range of 85-130V can power 120 V specific AC loads (e.g., a hairdryer, a refrigerator, or that like), which can be specific to a 120V system (e.g., 120 V, 60 Hz as provided in the U.S.) and can power AC loads in similar systems (e.g., 100 V, 60 Hz; 110 V, 60 Hz; 115 V, 60 Hz; 127 V, 60 Hz; 100 V, 50 Hz; 110 V, 50 Hz; 115 V, 50 Hz, and 127 V, 50 Hz). Similarly, a power source with an electrical storage that has a voltage output in the range of 180-264V can power 230 V and equivalent specific AC loads (e.g., a hairdryer, a refrigerator, or that like), which can be specific to a 230V system (e.g., 120 V, 60 Hz as provided in the U.S.), or an similar-type system (e.g., 220 V, 50 Hz; 230 V, 50 Hz; 220 V, 60 Hz; 240 V, 60 Hz). Stated another way, the power source disclosed herein can be designed and configured to power both a universal AC load and at least one of (1) an AC load that is specific to a 120 V (or similar) system, and/or (2) an AC load that is specific to a 230 V (or similar) system. A "similar system" for a 120 V system as referred to herein is any AC system that is within 85V and 130V and includes a nominal frequency that is 50 Hz or 60 Hz. A "similar system" for a 230 V system as referred to herein is any system within 180V and 264V that includes a nominal frequency of 50 Hz or 60 Hz.

Disclosed herein is a method to connect the power source to the universal AC load for powering the universal AC load. In various embodiments, the power source can include a battery with a voltage in the range of 85-130V (for 120V based systems) or 180-264V (for 230V based systems). However, the present disclosure is not limited in this regard. For example, as described further herein, the power source can include a fuel cell, a supercapacitor, or any other energy storage configured to supply a direct current and is still within the scope of this disclosure.

The power source disclosed herein can be connected to the universal AC load and include a switch that is turned on and off with a low-frequency signal that is in the order of 95 to 130 Hz and a duty cycle between 80 and 98%, in accordance with various embodiments. An inductor can be added in series with the switch and be configured to reduce in-rush currents, in accordance with various embodiments. Because the switching frequency is much lower than conventional methods (120 Hz vs e.g., 60 kHz) the energy losses are significantly lower. Furthermore, there is no need for a large inductor to filter out the high-frequency components. Although described herein as including an inductor, the present disclosure is not limited in this regard. For example, the power source could utilize a fuse instead of the inductor and still be within the scope of this disclosure. Furthermore, in various embodiments, the power source may not include the inductor or a fuse and would still be capable of powering a universal AC load. However, if the power source did not include the inductor or the fuse, there would be no way for the DC power device to prevent a short circuit, which would limit potential practical applications of the power source.

Referring now to FIGS. 1A and 1B, a perspective view (FIG. 1A) and a schematic view (FIG. 1B) of a power source 100 is illustrated in accordance with various embodiments. In various embodiments, the power source 100 is configured to power a universal AC load. In various embodiments, the power source 100 is configured to power a specific AC load (e.g., a 120V based system, a 230V based system, etc.). The present disclosure is not limited in this regard. The power source 100 is without a DC/AC converter. In this regard, the power source 100 is lighter, cheaper to manufacture, and takes up a significantly smaller envelope relative to a power supply that supplies direct current and has a DC/AC converter to power a universal AC load, in accordance with various embodiments.

The power source 100 comprises an energy storage device 110 and an electrical outlet 120 electrically coupled to the energy storage device 110. In various embodiments, the energy storage device 110 is configured to provide a range of voltage outputs that is entirely within a voltage range of 85 volts and 380 volts. Stated another way, a voltage range of an energy storage device 110 is entirely within the voltage range of 85 volts and 380 volts, in accordance with various embodiments. In various embodiments, the energy storage device 110 is configured for supplying a voltage output within an operational voltage range. For example, as described further herein, the operational voltage range for a 120 volt based system can be between 90 volts and 130 volts, in accordance with various embodiments, and an operational voltage range for a 230 volt based system can be between 180 volts and 260 volts, in accordance with various embodiments. In various embodiments, the energy storage device 110 is configured to supply a fixed voltage. In this regard, the energy storage device 110 is configured to supply a constant voltage during operation of the power source 100. In various embodiments, a power source 100 configured for a 230 volt system can power universal AC loads of a 120 volt based system. A "fixed voltage" as referred to herein is a voltage that is supplied at a constant value plus or minus 10%, or plus or minus 5%, or plus or minus any other typical fluctuations of voltage supplied by an energy storage that supplies direct current.

In various embodiments, the energy storage device 110 comprises a battery 115. However, the present disclosure is not limited in this regard. For example, the energy storage device 110 can comprise a fuel cell, a supercapacitor, a flywheel energy storage, a solar energy storage, nuclear energy storage, or any other energy storage capable of generating a voltage output. In various embodiments, the battery 115 comprises a plurality of cells (e.g., cylindrical cells, pouch cells, prismatic cells, etc.). In various embodiments, each cell in the plurality of cells of the battery 115 can comprise lithium-ion cells (e.g., a lithium-ion cylindrical cell with a nominal voltage of 3.7 volts). However, the present disclosure is not limited in this regard, and any chemistry for an electrochemical cell is within the scope of this disclosure. For example, nickel cadmium, nickel metal hydride, lead acid, lithium cobalt oxide, lithium iron phosphate, or any other rechargeable battery cell is within the scope of this disclosure.

In various embodiments, the battery 115 includes a plurality of cells. The plurality of cells can define an electrical path from the second terminal 114 through the plurality of cells of the battery 115, to the first terminal 112. In various embodiments, the plurality of cells of the battery 115 are configured to supply a voltage that is substantially equivalent to a universal AC Root-Mean-Square (rms) voltage range. For example, arranging 32 lithium-ion cells with a nominal voltage of 3.7 volts in series to form the battery 115 would vary in voltage between 96 volts and 130 volts. Similarly, arranging 36 lithium-iron-phosphate cells with a nominal voltage of 3.2 volts in series or 10 lead-acid cells with a nominal voltage of 12 volts in series would provide a similar range (i.e., between 90 volts and 131 volts for 36 lithium-iron phosphate cells and between 113 volts to 127 volts for 12 lead acid cells). A "substantially equivalent voltage" for a 120 volt based system, as referred to herein, is any energy storage that supplies a voltage range that is within an output voltage range of 85 volts and 135 volts, in accordance with various embodiments. Similarly, a "substantially equivalent voltage" for a 230 volt based system, as referred to herein, is any energy storage that supplies a voltage range that is within an outer voltage range of 180 volts and 264 volts. In various embodiments, a 230 volt based system can be configured by doubling the cells of a 120 volt based system. For example, for lithium-ion cells, 64 cells (2×32) could be utilized to form a system for a 230 volt based system.

In various embodiments, the battery 115 is an unregulated battery. An "unregulated battery" as referred to herein is a battery that supplies an output voltage that is not regulated. Stated another way, an "unregulated battery" provides a constant amount of power (i.e., the output voltage will decrease as the output current increases, and vice versa). In various embodiments, by having an unregulated battery for the battery 115, powering of the universal AC load can be facilitated as described further herein. Regulated batteries typically have a DC/DC converter, which adds cost and inefficiency into a respective system. Although some batteries are regulated, most commercial batteries (e.g., typical car batteries) are unregulated. The voltage on an AC grid is always unregulated (i.e., includes a wide variation in voltage-but not in frequency). Accordingly, the power source 100 disclosed herein can similarly handle a wide variation of voltage with an unregulated battery, in accordance with various embodiments. Although described herein as using an unregulated battery, the present disclosure is not limited in this regard. For example, a regulated battery could be used for the battery 115 and would still be within the scope of this disclosure. However, utilizing an unregulated battery would provide a greater efficiency relative to using a regulated battery for the battery 115, in accordance with various embodiments.

The electrical outlet 120 is configured to receive an electrical plug of a universal AC load (e.g., a three-pronged plug or a two-pronged plug for a U.S.-based AC load). In various embodiments, the power source 100 can include any number of electrical outlets (e.g., a plurality of the electrical outlet 120). In this regard, the power source 100 can be configured to power any number of AC loads simultaneously, in accordance with various embodiments. The present disclosure is not limited in this regard. The electrical outlet 120 comprises a first port 122 configured to be electrically coupled to the first terminal 112 (e.g., periodically as described further herein) during operation of the power source 100. Similarly, the electrical outlet 120 comprises a second port 124 configured to be electrically coupled to the second terminal 114. The first terminal 112 can be a positive terminal, and the second terminal 114 can be a negative terminal, or the first terminal 112 can be a negative terminal and the second terminal 114 can be a positive terminal. The present disclosure is not limited in this regard.

In various embodiments, each of the first port 122 and the second port 124 comprise a conductive element (e.g., conductive element 123 for first port 122 and conductive element 125 for second port 124). The conductive element 123, 125 is configured to contact a corresponding conductive element of an electrical plug to form a circuit with an AC load as described further herein. In various embodiments, the conductive element 123, 125 can comprise a bus, a pin, or any other conductive element configured to create an electrical interface with a mating electrical plug is within the scope of this disclosure. In various embodiments, a terminus of the first conductive line 130 is coupled to the conductive element 123 and a terminus of the second conductive line 140 is coupled to the conductive element 125.

In various embodiments, the power source 100 comprises a first conductive line 130 and a second conductive line 140. The first conductive line extends from the first terminal 112 to the first port 122. Similarly, the second conductive line 140 extends from the second terminal 114 to the second port 124. Each of the first conductive line 130 and the second conductive line 140 can comprise a conductive element, such as a wire, a bus bar, or any other conductive component capable of flowing current therethrough.

In various embodiments, one or both of the first conductive line 130 and the second conductive line 140 can have one or more electronic components coupled thereto. For example, an electrical switch S1 is coupled to terminus 133 of a first portion 132 of the first conductive line 130. The switch S1 is configured to transition between an open state and a closed state with a pole 135 of a second portion 136 of the first conductive line 130 to electrically connect the first portion 132 to the second portion 136 and subsequently electrically disconnect the first portion 132 from the second portion 136. In this regard, the electrical switch can comprise a single-pole, single throw switch, in accordance with various embodiments. However, the present disclosure is not limited in this regard and various other electrical switches are within the scope of this disclosure, as described further herein. Although illustrated as being coupled to the first conductive line 130, the electrical switch S1 is not limited in this regard. For example, the electrical switch S1 could be coupled to the second conductive line 140 and still be within the scope of this disclosure.

In various embodiments, an inductor L1 can be coupled to one of the first conductive line 130 or the second conductive line 140. The present disclosure is not limited in this regard. In various embodiments, the inductor L1 is arranged in series with the electrical switch S1 along the same conductive line (e.g., the first conductive line 130 or the second conductive line 140). However, the present disclosure is not limited in this regard. For example, the inductor L1 and the electrical switch S1 can be disposed on separate conductive lines (e.g., inductor L1 can be coupled to the first conductive line 130 and the electrical switch S1 can be coupled to the second conductive line 140 or vice versa), in accordance with various embodiments.

In various embodiments, and stated another way, the electrical switch S1 is disposed electrically between the first terminal 112 of the energy storage device 110 and the first port 122 of the electrical outlet 120. As described further herein, the electrical switch S1 can be actively controlled to periodically connect and disconnect the first terminal 112 to the first port 122 of the electrical outlet 120, in accordance with various embodiments. In various embodiments, the electrical switch S1 can be configured to disconnect at a set frequency (e.g., between 95 Hz and 130 Hz). In various embodiments, a duty cycle of the electrical switch S1 can be between 80% and 98%. In this regard, the duty cycle for the electrical switch S1 can be as high as possible to maximize a power transfer. However, the "off" time should be a certain time to prevent arcing. Arcing occurs when an electrical switch is turned off while current is flowing. The arcing can occur between electrodes and can damage the electrical switch S1 if prolonged too long. Accordingly the duty cycle of the switching of the electrical switch S1 can be between 80% and 98%, or between 90% and 98%, in accordance with various embodiments. This higher duty cycle contrasts with modified sine waves utilized by inexpensive DC/AC converters, which typically have a duty cycle of 50% and like AC power sources, have an average voltage of 0 volts. The modified sine waves utilized by inexpensive DC/AC converters are significantly less efficient relative to the power source 100 disclosed herein and still have various components to facilitate DC to AC conversion (e.g., transformers, transistors, etc.), adding weight and cost, in accordance with various embodiments.

In various embodiments, the power source 100 further comprises an inductor L1 disposed between the first terminal 112 of the energy storage device 110 and the first port 122 of the electrical outlet 120. Although illustrated as having the inductor L1 disposed between the electrical switch and the first port 122, the present disclosure is not limited in this regard. For example, the induct L1 can be disposed between the first terminal 112 and the electrical switch S1 and still be within the scope of this disclosure. In various embodiments, the inductor L1 can act as a safety feature while the power source 100 is in operation as described further herein.

In various embodiments, the power source 100 comprises a housing 105. The energy storage device 110 is disposed (e.g., entirely disposed) within the housing 105. The power source 100 can comprise a handle 104 coupled to the housing 105. In this regard, the power source 100 can be portable. In various embodiments, by being portable, and configured to power a universal AC load, the power source 100 can be used as a backup power source for universal AC loads in accordance with various embodiments. However, the present disclosure is not limited in this regard. For example, the power source 100 can be fixed, or immovable, and would still be within the scope of this disclosure.

In various embodiments, the power source 100 further comprises a control system 200. In various embodiments, the control system 200 comprises a controller 202, one or more sensors 208, a current-limiting inductor L1 and the electrical switch S1. In various embodiments, the one or more sensors 208 comprises a current sensor. In various embodiments, the controller 202 comprises one or more processors 204 and a memory 206. Although described herein with the one or more sensors 208 comprising a current sensor, the one or more sensors 208, the present disclosure is not limited in this regard. Any sensor capable of providing circuit data (e.g., current data, voltage data, or the like) and configured to provide data for controlling the electrical switch S1 is within the scope of this disclosure. For example, the sensor can comprise a resistive current sensor, or a Hall effect magnetic sensor. In various embodiments, the one or more sensors 208 can further comprise a second sensor (e.g., a thermal sensor) configured to protect the battery from thermal runaway.

In various embodiments, the controller 202 is configured as a central network element or hub to various systems and components of the control system 200. In various embodiments, controller 202 comprises a processor (e.g., only one of one or more processors 204). In various embodiments, the controller 202 can comprise an analog controller (i.e., one or more processors 204 without a memory). In various embodiments, controller 202 may be implemented as a single controller (e.g., via the one or more processors 204 and associated memory 206). In various embodiments, controller 202 may be implemented as multiple processors (e.g., a main processor and local processors for various components). The controller 202 can be a general-purpose processor, a microcontroller (μ), a digital signal processor (DSP), an application specific integrated circuit (ASIC), a field programable gate array (FPGA) or other programable logic device (PLD), discrete gate or transistor logic, discrete hardware components, or any combination thereof. The controller 202 may comprise one or more processors 204 configured to implement various logical operations in response to execution of instructions, for example, instructions stored on a non-transitory, tangible, computer-readable medium (e.g., memory 206, such as electrically erasable programmable read-only memory ("EEPROM")) configured to communicate with the controller 202. System program instructions and/or controller instructions may be loaded onto a non-transitory, tangible computer-readable medium (e.g., memory 206) having instructions stored thereon that, in response to execution by a controller 202, cause the controller 202 to perform various operations.

In various embodiments, the electrical switch S1 is in electronic communication (e.g., wireless or wired) with the controller 202. Stated another way, the electrical switch S1 is electronically coupled to the controller 202. In this regard, the controller 202 is configured to periodically transition the electrical switch S1 between an open state and a closed state. In various embodiments, the controller 202 can be configured to continuously transition the electrical switch S1 based on pre-set parameters as described further herein. In this regard, one or more sensors 208 may be optional for the control system 200, and the controller 202 can be configured to continuously transition the electrical switch S1 regardless of whether the power source 100 is coupled to an AC load. However, the present disclosure is not limited in this regard. For example, the electrical switch S1 can periodically transition the electrical switch S1 based on the pre-set parameters in response an electrical circuit with an AC load being created. Stated another way, as described further herein, the controller can receive sensor data (e.g., current data, voltage data, or the like) once an electrical circuit is created with the AC load. Responsive to receiving the sensor data, the controller can begin to transition the electrical switch S1 based on the pre-set parameters. Then, once the controller 202 no longer receives the sensor data (e.g., in response to the universal AC load is unplugged), the controller 202 can transition the electrical switch S1 to the closed state and repeat the process the next time an AC load is coupled to the power source 100.

In various embodiments, each of the one or more sensors 208 is in electronic communication (e.g., wireless or wired) with the controller 202. In this regard, each of the one or more sensors 208 can be configured to provide a continuous stream of data to the controller 202 during operation as described further herein. In various embodiments, based on the data received from each of the one or more sensors 208, the controller 202 can modulate the electrical switch S1 between an open state (i.e., to disconnect an electrical circuit created with an AC load as described further herein) and a closed state (i.e., to connect the electrical circuit created with the AC load). In various embodiments, the power source 100 could exclude each of the one or more sensors 208. However, each of the one or more sensors 208 can provide data to the controller 202 to ensure that the power source 100 is operating as intended, in accordance with various embodiments. The electrical switch S1 can be a relay, a metal-oxide-semiconductor field-effect transistor ("MOSFET"), a bipolar switch, insulated gate bipolar transistor ("IQBT") or any other electronic device that has the functionality of an electrical switch. The present disclosure is not limited in this regard.

Figure 2:
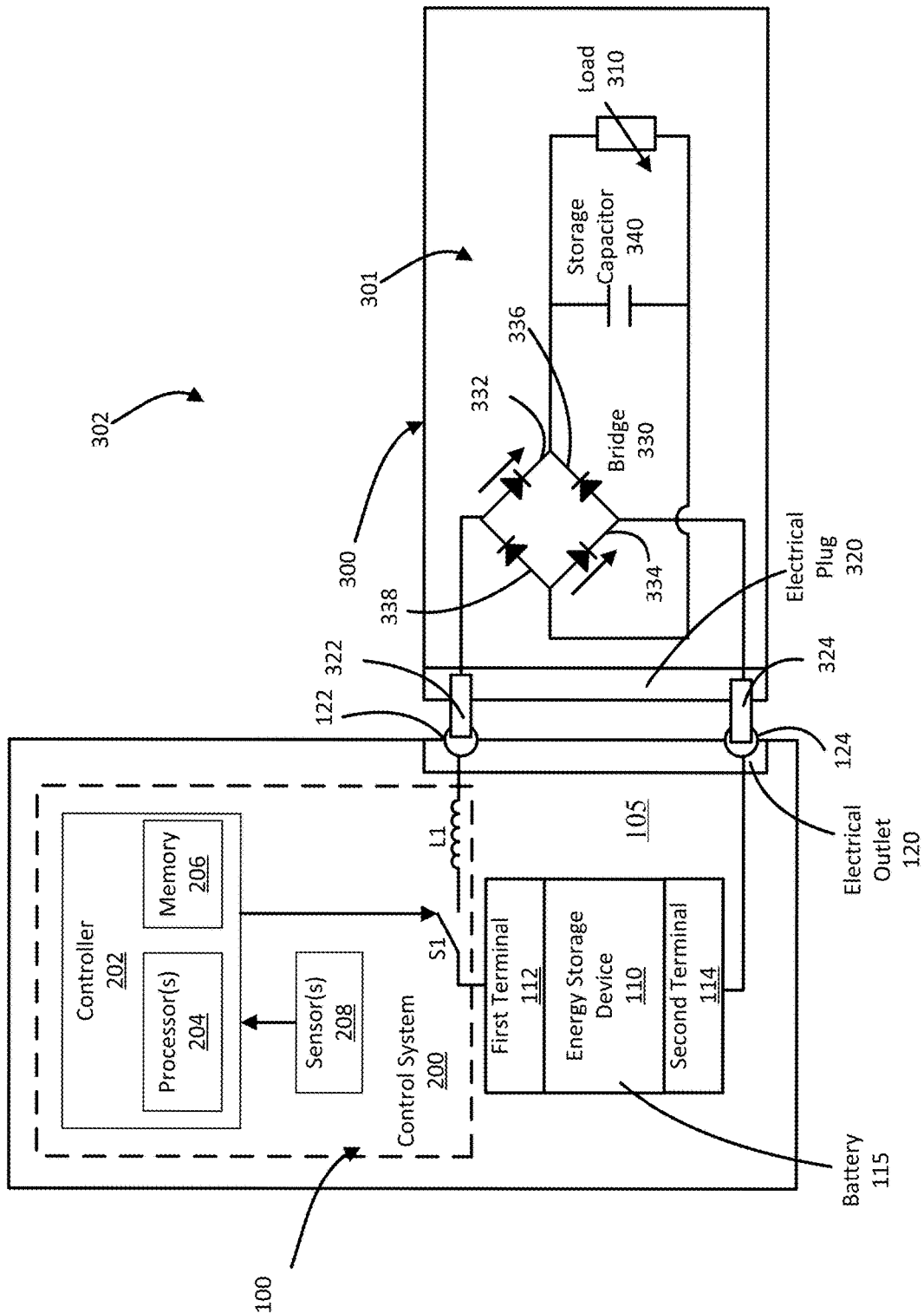
FIG. 2 illustrates a schematic view of a power source coupled to a universal AC load, in accordance with various embodiments.

Referring now to FIG. 2, a schematic view of a power source 100 in use (i.e., powering a universal AC load 300) is illustrated, in accordance with various embodiments. The universal AC load 300 comprises a load 310, an electrical plug 320, a diode bridge 330, and a storage capacitor 340. In various embodiments, the load 310 can comprise any load configured to receive an alternating current (e.g., kitchen appliances, such as toasters, microwaves, etc., electronics, such as televisions, phone chargers, radios, computer chargers, etc., fans, electric lamps, etc.). The present disclosure is not limited in this regard. In various embodiments, the electrical plug 320 comprises a first pin 322 (e.g., a hot pin) and a second pin 324 (e.g., a neutral pin). Although illustrated with only two pins (e.g., the first pin 322 and the second pin 324), the present disclosure is not limited in this regard. For example, the electrical plug 320 can additionally include a ground pin configured to be inserted into a ground port of an electrical outlet 120 of a power source 100 and be within the scope of this disclosure.

Typically, a universal AC load 300 is plugged into an AC source (e.g., an electrical socket in a home or the like). In response to the universal AC load 300 being plugged into an AC source, an electrical circuit is created. During operation of the universal AC load that is coupled to an AC source, the current travels across bridges 332 and 334 of the diode bridge 330 in response to a positive voltage being supplied, and the current travels across bridges 336, 338 of the diode bridge 330 in response to a negative voltage being supplied. In this regard, as the AC source transitions between positive voltage and negative voltage, the direction of the current changes, and all the bridges (e.g., bridges 332, 334, 336, 338) of the diode bridge 330 are in use during powering by an AC source. In contrast, while being powered by the power source 100 disclosed herein, only two bridges (e.g., bridges 332, 334 in response to the first terminal 112 being a positive terminal or bridges 336, 338 in response to the first terminal 112 being a negative terminal) of the diode bridge 330 are utilized. Similarly, the power source 100 is configured to power the universal AC load 300 regardless of which pins are disposed in which ports. For example, the first pin 322 can be a hot pin and the second pin 324 can be a neutral pin, or the first pin 322 can be a neutral pin and the second pin 324 could be a hot pin, and the power source 100 would still power the universal AC load. For example, if the first pin 322 is a hot pin and the second pin 324 is a neutral pin, the current travels across bridges 332 and 334 of the diode bridge 330 during operation of the power source 100, whereas if the first pin 322 is a neutral pin and the second pin 324 is a hot pin, the current travels across bridges 336 and 338 during operation of the power source 100. Accordingly, the power source 100 can be adaptable to either way of connection.

In various embodiments, with combined reference to FIGS. 1B and 2, the first pin 322 can contact the conductive element 123 of the first port 122 and the second pin 324 can contact the conductive element 125 of the second port 124. In this regard, responsive to the contact, the electrical circuit between the universal AC load and the power source 100 is created.

In accordance with various example embodiments, the power source 100 is configured to output a relatively high output voltage (e.g., 120 V where 32 cells having a nominal voltage of 3.7 volts are used, and more generally on the order of greater than 20x or 25x or 30x a single cell voltage). Moreover, the power source 100 is configured to output the relatively high output voltage using a conversion-less process. Stated another way, the power source 100 comprises no DC-DC upconverter to achieve the output voltage levels described herein. Thus, the power source is less expensive to build, more efficient, and more robust due to the absence of a DC-DC converter. In this regard, in an example embodiment, the power source 100 comprises more than 20, more than 25, or more than 30 cells in series.

Figure 3:
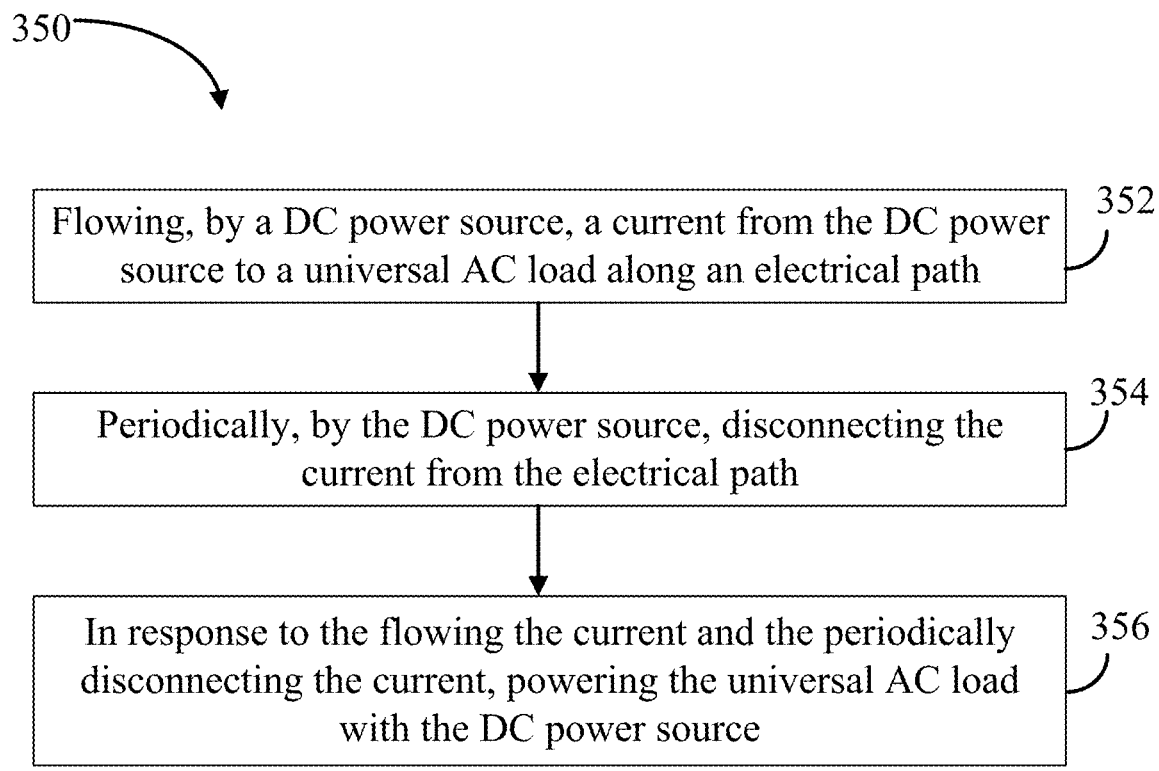
FIG. 3 illustrates a method of operating a power source to power a universal AC load, in accordance with various embodiments.

For example, with combined reference now to FIGS. 2 and 3, a method 350 of operating the power source 100 comprises flowing, by the power source 100, a current from the power source 100 to a universal AC load 300 along an electrical circuit 301 (step 352). The electrical circuit 301 is created in response to plugging an electrical plug 320 of the universal AC load into an electrical outlet 120 of the power source 100. In various embodiments, the current flows in a single direction (i.e., from the first terminal 112 of the energy storage device 110, through the bridge 332 of the diode bridge, through the storage capacitor 340 and the load 310 in parallel, along the bridge 334 of the diode bridge 330 to the second terminal 114. In this regard, only the bridges 332, 334 are utilized during operation of the power source 100.

In various embodiments, the current flowing from the power source 100 in step 352 is current flowing from an energy storage device 110. In various embodiments, the energy storage device 110 is a battery 115 as described previously herein. In various embodiments, the battery 115 is configured to supply an unregulated voltage output as described previously herein.

In various embodiments, the method 350 further comprises periodically, by the power source 100, disconnecting the current from the electrical circuit 301 (step 354). In various embodiments, the current is disconnected from the electrical circuit 301 at a frequency between 90 Hz and 135 Hz or between 90 Hz and 130 Hz. In various embodiments, a duty cycle of the periodic disconnecting of the current from the electrical path is between 80% and 98% or between 90% and 98%. In this regard, the duty cycle can be as high as possible to maximize power transfer to the universal AC load 300, while preventing arcing from taking place. In various embodiments, step 354 is an active step performed by the controller 202, as described further herein.

In various embodiments, in response to the flowing the current (from step 352) and periodically disconnecting the current (step 354), the method 350 further comprises powering the universal AC load 300 with the power source 100 (step 356). In various embodiments, powering the universal AC load 300 with the power source 100 by method 350 is highly efficient (i.e., greater than 99% efficient). In various embodiments, a system 302 for powering a universal AC load 300 with a power source 100 is significantly less than typical systems that power a universal AC load 300 with a DC energy storage (i.e., a system with a DC/AC converter). In various embodiments, the power source 100 includes a volume that is 5 times less and/or a weight that is up to three times less than a typical system for powering a universal AC load 300 by a DC energy storage (i.e., a typical DC power source coupled to a DC/AC converter). In various embodiments, the power source 100 has a greater efficiency relative to a DC/AC converter (e.g., greater than 99% compared to between 85 and 90%).

Figure 4:
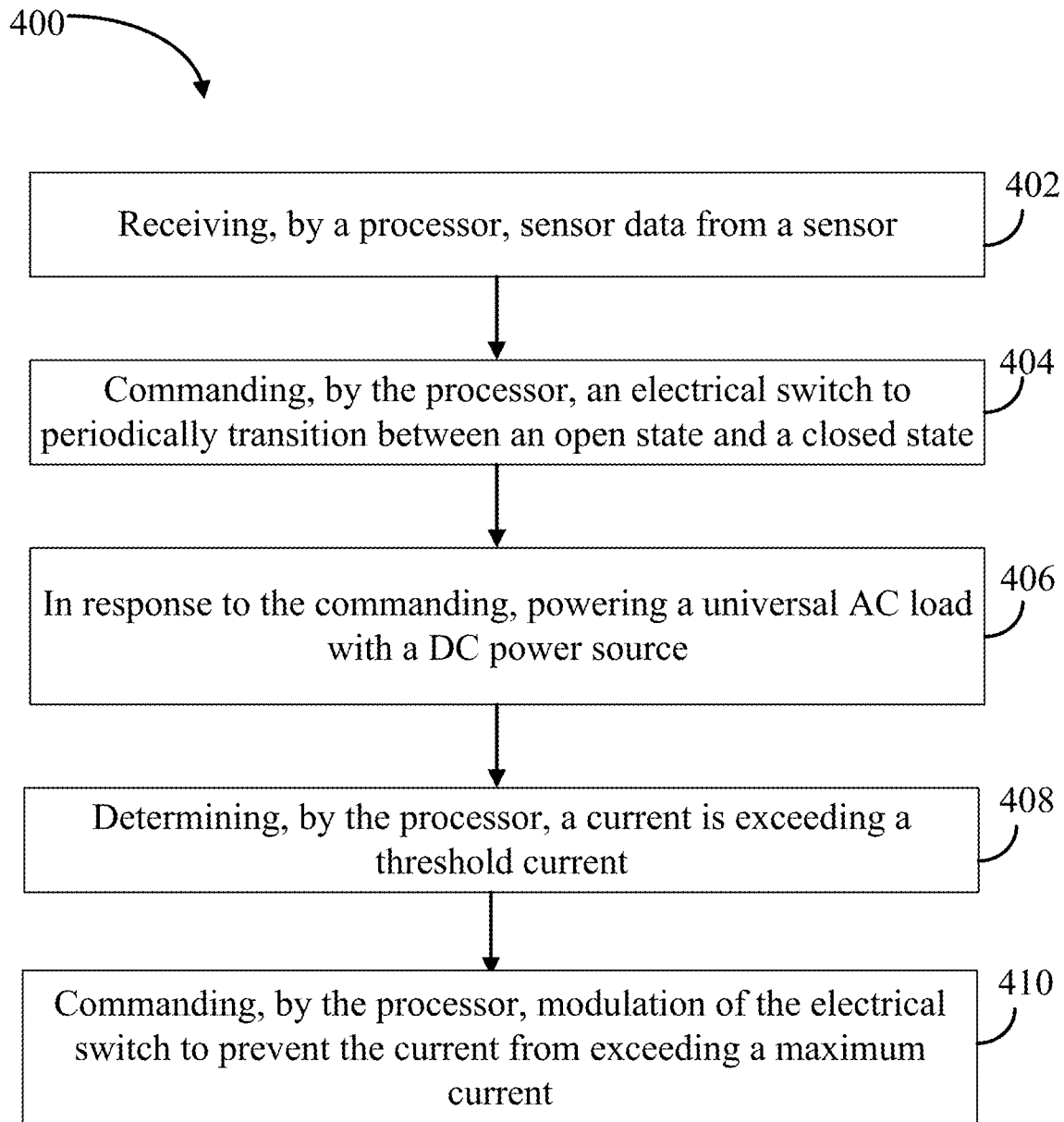
FIG. 4 illustrates a process for operating a power source to power a universal AC load, in accordance with various embodiments.

Referring now to FIGS. 2 and 4, a process 400 performed by the control system 200 of the power source 100 is illustrated, in accordance with various embodiments. The process 400 includes receiving, by the one or more processors 204 of the controller 202, sensor data from each of the one or more sensors 208 (e.g., current data, voltage data, Hall effect data, or the like) (step 402). In various embodiments, in response to the one or more processors 204 receiving initial data from the sensor, the one or more processors 204 can determine that the power source 100 is electrically coupled to a universal AC load 300. For example, the one or more processors 204 can be configured to command the electrical switch S1 to transition to a closed state in response to determining that current is no longer flowing across an electrical path of the power source 100. Stated another way, in response to the power source 100 being disconnected from a universal AC load 300, the one or more processors 204 of the controller 202 can command the electrical switch S1 to close (e.g., if the electrical switch S1 is in an open state at the point of the power source 100 being disconnected from the universal AC load 300). In this regard, by the electrical switch S1 always being in a closed state when a universal AC load 300 is connected to the power source 100, a current will always flow in response to the universal AC load 300 being connected to the power source 100. In this regard, the one or more processors 204 can be triggered by determining the current is flowing (e.g., in response to receiving the sensor data in step 402), in accordance with various embodiments.

Figure 5A:
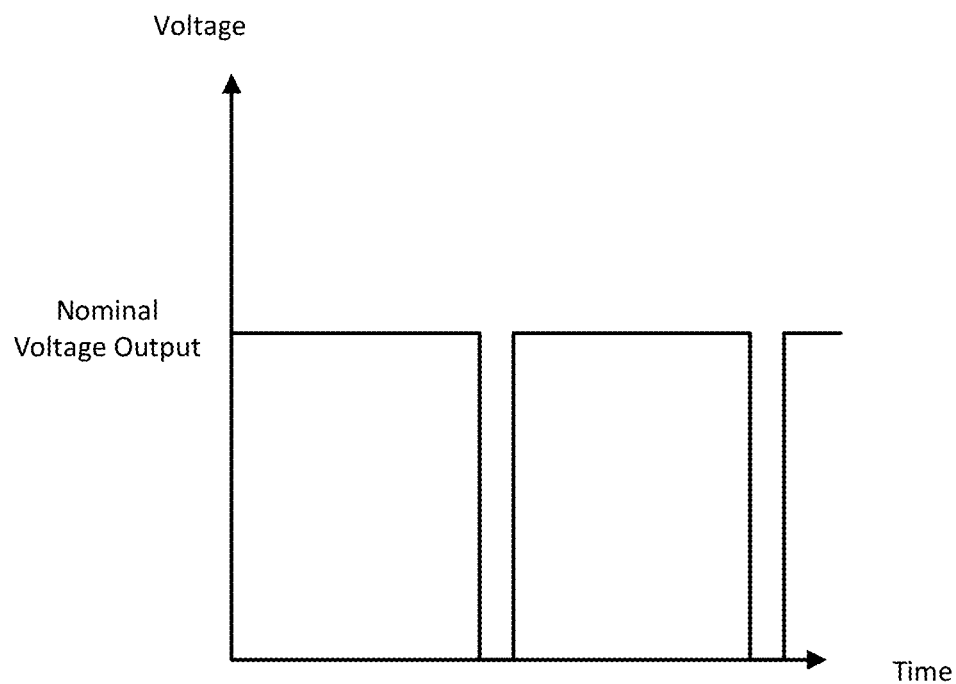
FIG. 5A illustrates a plot of voltage vs time during operation of a power source to power a universal AC load, in accordance with various embodiments.

In various embodiments, the process 400 further comprises commanding, by the one or more processors 204, the electrical switch S1 to periodically transition between an open state and a closed state (step 404). The transitioning between the open state and the closed state occurs at a set frequency and a set duty cycle. For example, the set frequency can be between 90 Hz and 135 Hz or between 95 Hz and 130 Hz. In various embodiments, the set duty cycle can be between 80% and 98% or between 90% and 98% as described previously herein. A "duty cycle" as referred to herein described the amount of time the electrical switch S1 is in a closed state (i.e., to allow current to flow along the electrical circuit 301) as a percentage of the total time it takes to complete one cycle. The open state disconnects the current from the electrical circuit 301 defined between the power source 100 and the universal AC load 300 in response to the electrical plug 320 of the universal AC load 300 being coupled to the electrical outlet 120 of the power source. In the closed state, the current from the electrical circuit 301 is re-connected between the power source 100 and the universal AC load 300. For example, with brief reference to FIG. 5A, a plot of voltage as a function of time along the electrical circuit 301 defined between the power source 100 and the universal AC load 300 is illustrated, in accordance with various embodiments. As illustrated, in response to transitioning between the open state and the closed state at the set frequency and the set duty cycle, a rectangular wave form that transitions between a fixed voltage of the energy storage device 110 and zero volts is formed, in accordance with various embodiments. A "rectangular wave form" as referred to herein includes a profile that is within a nominal rectangular wave form plus or minus 20%. Stated another way, there can be some variability in the wave form during operation of the power source 100, which would still be within the scope of this disclosure.

In various embodiments, in response to the commanding the electrical switch S1 in step 404, the universal AC load 300 is powered with the power source 100 (step 406). In this regard, the periodic connecting and disconnecting of step 404 described herein can facilitate powering of the universal AC load by the power source 100, in accordance with various embodiments.

Figure 5B:
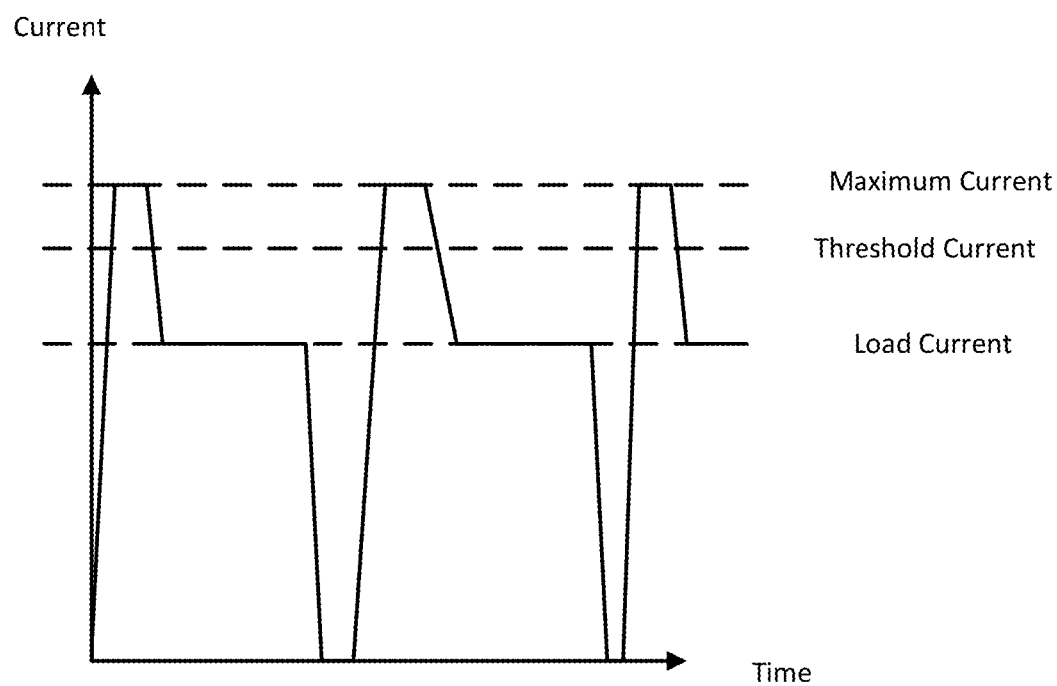
FIG. 5B illustrates a plot of current vs time during operation of a power source to power a universal AC load, in accordance with various embodiments.

In various embodiments, the process 400 further comprises determining, by the one or more processors 204 of the controller 202, that a current is exceeding a threshold current (step 408). In various embodiments, the one or more processors 204 can be continuously receiving sensor data from the sensor in step 402. In this regard, the one or more processors 204 can determine when a current traveling along the electrical circuit 301 exceeds a threshold current (e.g., a safety limit or the like). In response to determining the current is exceeding a threshold current in step 408, the one or more processors 204 of the controller 202, commands modulation of the electrical switch to prevent the current from exceeding a maximum current (step 410). For example, with brief reference to FIG. 5B, a plot of current as a function of time (when a threshold current is being exceeded) along the electrical circuit 301 defined between the power source 100 and the universal AC load 300 is illustrated, in accordance with various embodiments. As illustrated, in response to the current exceeding the threshold current, the modulation of the electrical switch S1 can prevent the maximum current from being exceeded, to bring the current back down to a load current and then continue a respective cycle, in accordance with various embodiments.

Figure 6:
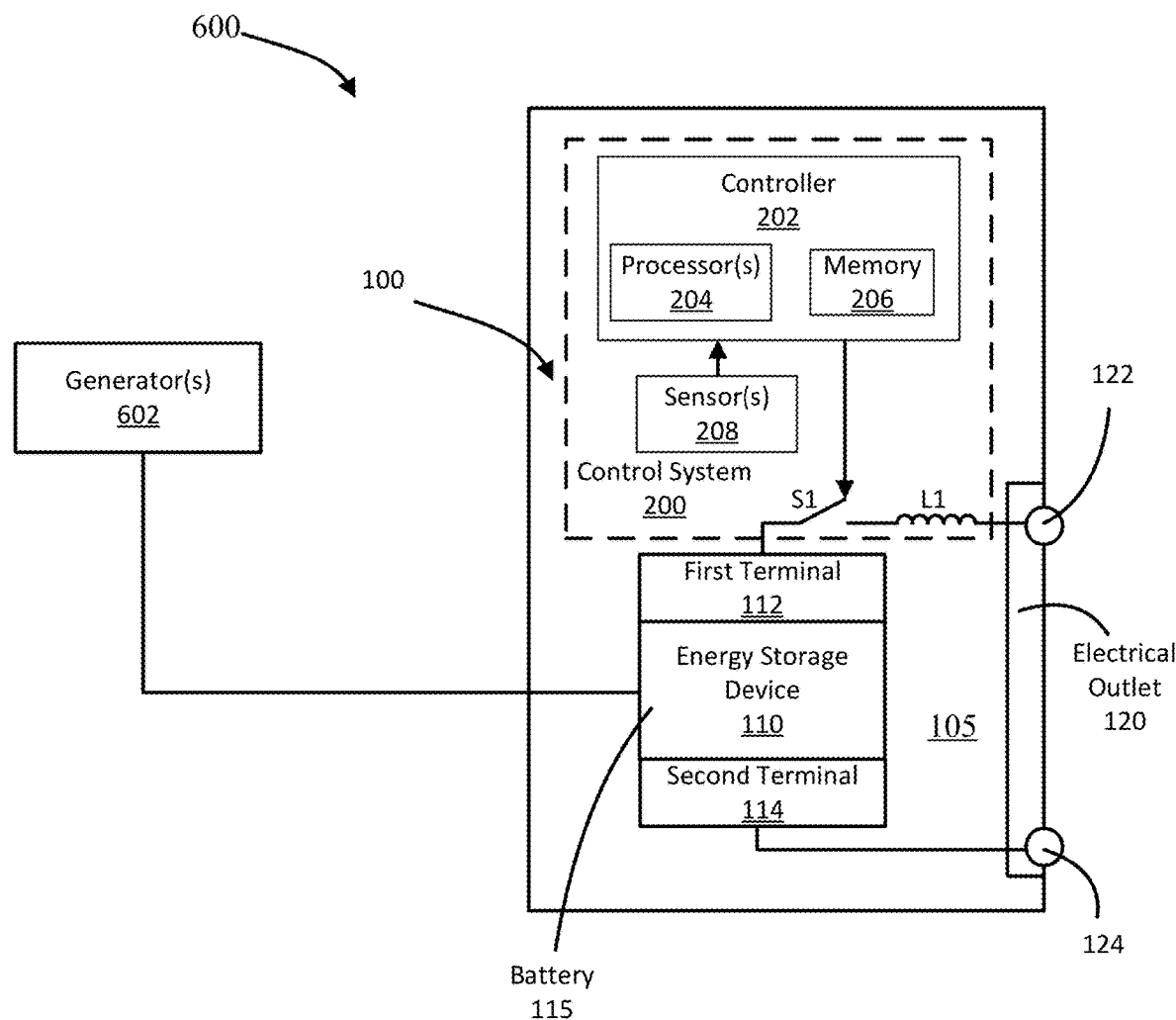
FIG. 6 illustrates a schematic view of a system for powering an AC load, in accordance with various embodiments.

Referring now to FIG. 6, a schematic view of a system 600 configured for powering a universal AC load (e.g., universal AC load 300 from FIG. 2), is illustrated in accordance with various embodiments. In various embodiments, the system 600 can comprise one or more generators 602. Each of the one or more generators 602 can be configured to convert one form of energy (e.g., motion-based energy such as wind powered or wave powered, photovoltaic based energy such as solar powered, fuel powered generators such as fuel cell generators, or the like) to electrical energy. For example, the one or generators 602 can comprise a solar panel, a wind turbine, a hydroelectric generator, a nuclear generator, a geothermal generator, or any other generator capable of converting one form of energy to a direct current for charging the energy storage device 110. In this regard, the system 600 can be configured to charge the energy storage device 110 (e.g., via the one or more generators 602) and store the electrical energy in the energy storage device 110. Then, in response to a universal AC load (e.g., universal AC load 300) being electrically coupled to the system 600, the system 600 can be configured to discharge the electrical energy as described previously herein (e.g., in accordance with method 300) to power the universal AC load.

A power source configured to power an alternating current ("AC") load is disclosed herein. In various embodiments, the power source comprises: an energy storage device configured for an average voltage output that is between 85 volts and 380 volts, the energy storage device comprising a first terminal and a second terminal, the energy storage device configured to supply a direct current; and an electrical outlet including a first port in electrical communication with the first terminal and a second port in electrical communication with the second terminal, the electrical outlet configured to be coupled to the alternating current ("AC") load.

In various embodiments, in response to coupling the electrical outlet to the alternating current ("AC") load, a current from the energy storage device automatically flows only in a first direction and only uses a first diode and a second diode of a diode bridge during powering of the alternating current ("AC") load.

In various embodiments, in response to coupling the power source to the alternating current ("AC") load, an electrical circuit is created to power the alternating current ("AC") load, and the electrical circuit is without a DC/AC converter.

In various embodiments, the energy storage device comprises one of a battery, fuel cell, a supercapacitor, a flywheel energy storage, a solar energy storage, or nuclear energy storage. In various embodiments, the energy storage device comprises the battery, and the battery comprises a plurality of cells, and wherein an electrical path is defined from the second terminal through the plurality of cells to the first terminal. In various embodiments, each of the plurality of cells is one of a lithium-ion cell, a nickel cadmium cell, a nickel metal hydride cell, a lead acid cell, a lithium cobalt oxide cell, or a lithium iron phosphate cell. In various embodiments, the battery is an unregulated battery. In various embodiments, a nominal voltage output of the battery is between one of: 85 volts and 135 volts, and 180 volts and 264 volts.

In various embodiments, the power source further comprises an electrical switch and an inductor disposed in series between the first terminal of the energy storage device and the first port of the electrical outlet. In various embodiments, the electrical switch is configured to periodically transition between open and closed at a frequency between 95 Hz and 130 Hz. In various embodiments, the power source further comprising a controller in electronic communication with the electrical switch, wherein the controller is configured to transition the electrical switch between an open state and a closed state at a duty cycle between 80% and 98%. In various embodiments, the controller is configured to: determine a current exceeded a threshold current, and modulate the electrical switch to prevent the current from exceeding a maximum current.

In various embodiments, the power source comprises one or more sensors in electrical communication with the controller, wherein the controller is configured to determine whether a current exceeded a threshold current based on data from at least one of the one or more sensors.

In various embodiments, the power source comprises a housing, wherein: the energy storage device is disposed within the housing, and the electrical outlet is coupled to the housing.

A system for powering the alternating current ("AC") load is disclosed herein. In various embodiments, the system comprising the power source; and the alternating current ("AC") load coupled to the power source.

In various embodiments, the power source comprises an energy output efficiency of greater than 98% in response to powering the alternating current ("AC") load.

In various embodiments, the energy storage device comprises a plurality of cells, and the average voltage output is at least twenty times a nominal voltage for each of the plurality of cells. In various embodiments, the power source is without a DC-DC upconverter.

A system comprising the power source is disclosed herein. In various embodiments, the system further comprises an electrical generator configured to generate direct current electricity, wherein the electrical generator is electrically coupled to the energy storage device.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. An apparatus comprising a memory configured to communicate with one or more processors, the memory having instructions stored thereon that, in response to execution by the one or more processors, cause the one or more processors to perform operations that cause an energy storage device that provides a direct current to power an alternating current (AC) load, the operations comprising:
    receiving, by the one or more processors, sensor data from each of one or more sensors;
    commanding, by the one or more processors, an electrical switch to transition between an open state and a closed state, wherein:
        a duty cycle for an operational cycle of the electrical switch is between 80% and 98%, and
        a frequency of the operational cycle is between 90 Hz and 135 Hz; and
    in response to the periodically transitioning the electrical switch, generating a rectangular wave form from the energy storage device that supplies the direct current, the rectangular wave form supplied to a bus of a power source.

2. The apparatus of claim 1, wherein in response to the generating the rectangular wave form, the alternating current (AC) load is powered by the energy storage device.

3. The apparatus of claim 1, wherein the operations further comprise determining, by the one or more processors, the power source is coupled to the alternating current (AC) load in response to receiving the sensor data.

4. The apparatus of claim 1, wherein the operations further comprise:
    determining, by the one or more processors, a current is exceeding a threshold current; and
    in response to the determining the current is exceeding the threshold current, commanding, by the one or more processors, modulation of the electrical switch to prevent the current from exceeding a maximum current.

5. An electronic system comprising the apparatus of claim 1, the electronic system comprising the energy storage device, the electrical switch, and an inductor.

6. The electronic system of claim 5, wherein the one or more sensors comprise at least one of a current sensor or a magnetic sensor.

7. The electronic system of claim 5, wherein the energy storage device comprises a plurality of cells electrically coupled together to form a battery.

8. The electronic system of claim 7, wherein the powering the alternating current (AC) load further comprises outputting an average voltage output that is at least 20 times a nominal voltage output of each of the plurality of cells.

9. The apparatus of claim 1, wherein the powering the alternating current (AC) load with the energy storage device is a conversion-less process.

10. A control system for a power source configured to power an alternating current (AC) load, the control system comprising:
    one or more sensors;
    an electrical switch;
    a controller in electrical communication with each of the one or more sensors and the electrical switch, the controller configured to:
        receive, by the controller, sensor data from each of the one or more sensors;
        command, by the controller, the electrical switch to be in a closed state between 80% and 98% of a total time per operational cycle and an open state a remaining percentage of the total time per operational cycle, wherein a frequency of the operational cycle is between 90 Hz and 135 Hz; and
        in response to the command, generating a rectangular wave form from an energy storage device that supplies a direct current.

11. The control system of claim 10, wherein responsive to the generating the rectangular wave form, the alternating current (AC) load is powered with the energy storage device of the power source.

12. The control system of claim 10, wherein the controller is further configured to:
    determine that a current is traveling along an electrical circuit defined between the power source and the alternating current (AC) load has exceeded a threshold current; and
    command the electrical switch to modulate to prevent the current from exceeding a maximum current.

13. The control system of claim 10, wherein the controller is further configured to:
    determine that the power source has been disconnected from the alternating current (AC) load; and
    command the electrical switch to transition to the closed state in response to determining that the power source has been disconnected from the alternating current (AC) load.

14. The control system of claim 10, wherein a first of the one or more sensors comprises one of a current sensor or a magnetic sensor.

15. The control system of claim 14, wherein a second of the one or more sensors comprises a thermal sensor.

16. The control system of claim 10, further comprising an inductor disposed in series with the electrical switch.

17. The power source comprising the control system of claim 10, the power source comprising the energy storage device and a portion of an electrical circuit, the portion of the electrical circuit comprising the electrical switch.

18. The power source of claim 17, wherein:
- the energy storage device comprises a plurality of cells that are electrically coupled together to form an unregulated battery, and
- the energy storage device is configured to output an average output voltage that is at least 20 times a nominal voltage of each of the plurality of cells.

* * * * *